United States Patent Office 3,757,017
Patented Sept. 4, 1973

3,757,017
4,5-POLYMETHYLENE-PYRIMIDINE DERIVATIVES
Jacques Mathieu, 44 Avenue Heydenberg, Brussels, Belgium
No Drawing. Filed Jan. 22, 1968, Ser. No. 699,314
Claims priority, application Great Britain, Jan. 25, 1967, 3,775/67
Int. Cl. C07d 87/38
U.S. Cl. 260—247.5 B 6 Claims

ABSTRACT OF THE DISCLOSURE

New 4,5-polymethylene-pyrimidine derivatives of the general formula

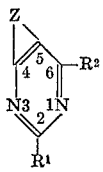

in which

Z is a polymethylene chain containing 3 to 6 carbon atoms
$R^1$ is hydrogen, halogen, alkyl, hydroxyalkylamino or morpholino,
$R^2$ is hydrogen, hydroxyalkylamino, bis(hydroxyalkyl)amino, N-alkyl-N-hydroxyalkylamino or morpholino, with the proviso that when $R^2$ is hydrogen, $R^1$ must be a hydroxyalkylamino or morpholino radical, as well as their salts with inorganic or organic acids.

The compounds are hypotensives, peripheral and coronary vasodilators, diuretics, bronchodilators, spasmolytics and circulatory and respiratory analeptics.

---

The present invention is concerned with new 4,5-polymethylene-pyrimidine derivatives and the addition salts thereof with pharmaceutically acceptable acids, as well as with the preparation thereof and their therapeutic use.

The new compounds according to the present invention have the general formula:

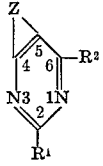

in which

Z is a member selected from the group consisting of unsubstituted and substituted polymethylene chains containing 3 to 6 carbon atoms,
$R^1$ is a member selected from the group consisting of hydrogen, halogen, straight and branched chain alkyl radicals containing up to 5 carbon atoms, hydroxy alkylamino and morpholino, and
$R^2$ is a member selected from the group consisting of hydrogen, hydroxylakylamino, bis(hydroxyalkyl)amino, N-alkyl-N-hydroxyalkylamino and morpholino, with the proviso that when $R^2$ is hydrogen, $R^1$ must be a radical selected from the group consisting of hydroxyalkylamino and morpholino, as well as their salts with inorganic and organic acids.

Pharmacological investigations have shown that the new compounds according to the present invention possess interesting properties, some of them being hypotensives, peripheral and coronary vasodilators, diuretics, bronchodilators and spasmolytics and some of them being circulatory and respiratory analeptics.

The following list of compounds according to the invention has been chosen to illustrate the pharmacological activity. This is on the understanding that said list is not restrictive, as all the compounds of the invention have been submitted to the tests mentioned hereafter.

(A) 2-propyl-4,5-tetramethylene-6-morpholino-pyrimidine.
(B) 2-propyl-4,5-trimethylene-6-morpholino-pyrimidine.
(C) 2-methyl-4,5-tetramethylene-6-morpholino-pyrimidine.
(D) 2,6-dimorpholino-4,5-tetramethylene-pyrimidine.
(E) 2-morpholino-4,5-tetramethylene-6-(2-hydroxyethyl)amino-pyrimidine.
(F) 4,5-tetramethylene-6-(2-hydroxyethyl)amino-pyrimidine.
(G) 2-chloro-4,5-tetramethylene-6-[(2-hydroxyethyl)amino]-pyrimidine.
(H) 4,5-tetramethylene-6-morpholino-pyrimidine.
(I) 2-propyl-4,5-pentamethylene-6-[bis(2-hydroxyethyl)amino]-pyrimidine.
(J) 2-propyl-4,5-tetramethylene-6-[N,N-(2-hydroxyethyl)(methyl)amino]-pyrimidine.
(K) 2-propyl-4,5-trimethylene-6-[bis(2-hydroxyethyl)amino]-pyrimidine.
(L) 2-propyl-4,5-hexamethylene-6-(2-hydroxyethyl)amino-pyrimidine.
(M) 2-propyl-4,5-hexamethylene-6-morpholino-pyrimidine.
(N) 2-morpholino-4,5-tetramethylene-pyrimidine.
(O) 2-isobutyl-4,5-tetramethylene-6-morpholino-pyrimidine.

(a) Hemodynamic influence as detected by measuring the cardiac output

The tested products are intravenously injected in anesthetized dogs under artificial respiration. The aortic output is continuously recorded. In these tests, the products of the invention markedly increase the cardiac output, as can be seen from the table herebelow, during a considerable time (more than 15 minutes), at a dose of 2 mg./kg.

| Product: | Percent output increase |
|---|---|
| A | 40 |
| B | 40 |
| O | 25 |
| J | 80 |
| K | 25 |

(b) Peripheral vasodilator effect on dog's leg

The dog's leg is perfused with a constant blood output according to the technique described by D. Wellens (Arch. Int. Pharmacodyn. 151 (1964), 281–285). The products are injected in the perfusion circuit and their vasodilator effect is manifested by a decrease in perfusion pressure.

Product D of the invention has a 175% greater activity than theophylline and product A even a 70% greater activity.

Hence, the products of the invention reduce the peripheral resistance and, in this way they can relieve the cardial work, improve the peripheral circulation and cope with an arterial hypertension.

(c) Coronarodilator effect

A variant of the known method of Lagendorff is applied. The details of the technique and apparatus combine certain features described E. Vanremoortere. J. Lecomte, H. Mazella and F. Nelemans (Arch.int. Pharmacodyn.95 (1953), 466–487) with certain modifications used by R. Charlier (Monographs on pure and applied Biology, vol. 10, Pergamon Press, 1961).

The compounds are tested at a concentration of respectively 20 micrograms/ml. (col. I) 50 micrograms/ml. (col. II) or 100 micrograms/ml. (col. III) and the increase in coronary output is expressed in percent:

| Product | I | II | III |
|---|---|---|---|
| Theophylline | 39 | 35 | |
| A | 146 | 210 | |
| C | 67 | | |
| D | 41 | | |
| G | | | 134 |
| H | 45 | | |
| I | 62 | | |
| K | | | 71 |

It can be seen that the products of the invention are more active than theophylline in its coronarodilator effect.

(d) Dilatation of the isolated trachea of guinea-pigs

The dilator effect of the products is determined by means of a continuous recording of the endotracheal tonus of the guinea-pig. The trachea is isolated and prepared according to the technique described by D. Wellens (Med. Pharm. Exptl. 14 (1966), 427–434).

The endotracheal tonus decrease is expressed in mm. $H_2O$ at the doses of 2 and 20 micrograms/ml.

| Product | Dose 2 μg./ml. | 20 μg./ml. |
|---|---|---|
| Theophylline | 2.3 | 25 |
| A | 13 | |
| C | | 13 |
| E | | 10 |
| F | | 10 |
| H | | 25 |
| J | | 16 |
| L | | 8 |
| M | | 9 |

Product A of the invention has, consequently, a higher dilatating activity on the respiratory tract than that of theophylline.

(c) Protective effect against bronchospasm induced in guinea-pigs

The method of H. Konzett and R. Roessler (Arch. exp. Path. Pharmakol. 195 (1940), 71–74) is applied on masculine and feminine albino guinea-pigs weighing between 300 and 500 g.

The following table gives the results of comparative tests between theophylline and some products of the invention.

| Compound | Bronchospasm | Number of animals | Doses, mg./kg. | Maximum effect (at 2 min.) | Effect 12 min. after injection |
|---|---|---|---|---|---|
| Theophylline | Acetylcholine | 8 | 2 | 18 | 3.7 |
| | | | 4 | 41 | 15.2 |
| | | | 8 | 76 | 38.1 |
| | | | 16 | 92 | 60.6 |
| Do | Histamine | 10 | 2 | 30 | 3.6 |
| | | | 4 | 50.4 | 17 |
| | | | 8 | 81.6 | 52 |
| | | | 16 | 93.7 | 92.7 |
| Do | 5-hydroxytryptamine | 8 | 2 | 20.5 | +2 |
| | | | 4 | 48.4 | 20 |
| | | | 8 | 79.6 | 48 |
| | | | 16 | 86 | 79 |
| Product A | Acetylcholine | 8 | 0.5 | 16.6 | 5 |
| | | | 1 | 31.2 | 17.1 |
| | | | 2 | 42.4 | 16.2 |
| | | | 4 | 65.6 | 42.8 |
| | | | 8 | 68.5 | 52.3 |
| Do | Histamine | 8 | 0.5 | 41.7 | 1.7 |
| | | | 1 | 65.3 | 19.8 |
| | | | 2 | 82.5 | 44.3 |
| | | | 4 | 92.3 | 76.8 |
| | | | 8 | 98.8 | 93.2 |
| Do | 5-hydroxytryptamine | 8 | 0.5 | 18.9 | 2.5 |
| | | | 1 | 44.7 | 16.4 |
| | | | 2 | 63.2 | 34.5 |
| | | | 4 | 79.1 | 68.1 |
| | | | 8 | 91.4 | 82.4 |
| Product J | Acetylcholine | 6 | 1 | 20 | 7 |
| | | | 3 | 33 | 10 |
| | | | 9 | 57 | 17 |
| Do | 5-hydroxytryptamine | 6 | 3 | 57 | 11 |
| | | | 9 | 84 | 22 |
| Product N | Acetylcholine | 4 | 3 | 12 | 0 |
| | | | 9 | 51 | 9 |

The table shows that the protective effect of certain compounds according to the invention against experimental bronchospasm is markedly superior to that of theophylline. Their use in the treatment of spastic states of the bronchial unstriated muscles (asthma, bronchitis, emphysema) can consequently be considered.

(f) Spasmolytic effect on isolated organs

Isolated intestine preparations (of rat or guinea-pig) are placed in a survival bath according to the known method described by R. Magnus (Pflügers Arch. 102 (1904), 123–151). The efficaceous dose DE 50 is determined (in micrograms/ml.), that antagonizes 50% of the convulsivant effect (induced by barium chloride or acetylcholine).

The found DE 50 value is given in the following table for both theophylline and the Product A of the invention:

| | Theophylline | Product A |
|---|---|---|
| $BaCl_2$ | 572 | 5.76 |
| Acetylcholine | 292 | 6 |

Product A consequently appears to be considerably more active than theophylline.

From the pharmacological tests (a) to (f) it appears that the products of the invention have analogous effects to those of theophylline, besides pronounced advantages over that substance.

Consequently, the products of the invention can be used in the therapeutical applications wherever theophylline is used.

The new compounds according to the present invention may be prepared, for example, by the following methods:

(1) a 2-$R^1$-4,5-polymethylene-6-halo-pyrimidine, $R^1$ being a member selected from the group consisting of hydrogen, halogen and alkyl, is reacted with a compound of formula $R^2H$, $R^2$ having the same meaning as in the General Formula I given above.

(2) a 2-halo-4,5-polymethylene-6-$R^2$-pyrimidine, $R^2$ having the same meaning as in the General Formula I given above, is reacted with a member selected from the group consisting of hydrogen, hydroxyalkylamine and morpholine.

The 2-$R^1$-4,5-polymethylene-6-$R^2$-pyrimidine derivatives (I) thus obtained may subsequently be converted into their salts with mineral and organic acids.

The halopyrimidines used as starting materials in the processes for the preparation of the new compounds according to the present invention can be obtained in known manner, especially by the action of a halogenating agent, such as phosphorus oxychloride, on the corresponding hydroxy-pyrimidines.

These hydroxy-pyrimidines are themselves prepared by known methods, such as the condensation of appropriate amidines with an appropriate beta-keto ester or beta-diester in an alcoholic medium in the presence of sodium methylate or sodium ethylate.

The following examples are given for the purpose of illustrating the present invention.

EXAMPLE 1

2-propyl-4,5-tetramethylene-6-morpholino-pyrimidine

A mixture of 42.1 g. (0.2 mol) 2-propyl-4,5-tetramethylene-6-chloropyrimidine and 70 g. (0.8 mol) morpholine is heated to 130° for 5 hours.

The reaction mixture is cooled and 100 ml. water are added. The mixture is then extracted with 100 ml. benzene. The benzene phase is washed with water and dried over anhydrous sodium sulfate. After evaporation of the solvent, the residue is distilled to give 48.3 g. (0.185 mol) 2-propyl-4,5-tetramethylene - 6 - morpholino-pyrimidine with a boiling point of 142–144° C./0.005 mm. Hg, which corresponds to a yield of 92.5% of theory.

The free base melts at 60° C. and its hydrochloride, after recrystallisation from ether, at 191° C.

EXAMPLE 2

2-propyl-4,5-pentamethylene-6-morpholino-pyrimidine

A mixture of 22.4 g. (0.1 mol) 2-propyl-4,5-pentamethylene-6-chloropyrimidine and 17.4 g. (0.2 mol) morpholine in 100 ml. anhydrous dioxan is boiled under reflux for 16 hours. The reaction mixture is cooled and morpholine hydrochloride formed during the reaction is filtered off. The filtrate is evaporated to dryness and the residue distilled in a vacuum. There are obtained 24.3 g. (0.088 mol) of the free 2-propyl-4,5-pentamethylene-6-morpholino-pyrimidine base (88% of theory) with a boiling point of 144–146° C./0.001 mm. Hg from which can be prepared, in ethereal solution, the corresponding hydrochloride with a melting point of 210–211° C.

The following compounds are prepared in an analogous manner:

2-methyl-4,5-tetramethylene - 6 - morpholino-pyrimidine; B.P. 129–133° C./0.001 mm. Hg; M.P. 71–72° C. This compound is prepared starting from 2-methyl-4,5-tetramethylene-6-chloro-pyrimidine (see G. W. Miller and F. L. Rose, J.C.S., 1963, 5642–5659).

2 - methyl - 4,5 - tetramethylene-6-(2-hydroxyethyl) amino-pyrimidine; M.P. 148–149° C.

2 - propyl - 4,5 - tetramethylene-6-[N,N-(2-hydroxyethyl)(methyl)amino]-pyrimidine; B.P. 128–130° C./0.02 mm. Mg- $n_D^{21}$=1.5184 (unstable product).

2 - isobutyl - 4,5 - tetramethylene-6-(2-hydroxyethyl) amino-pyrimidine; M.P. 159–160° C., after recrystallisation from ethyl acetate-hexane.

2 - isobutyl - 4,5 - tetramethylene - 6-morpholino-pyrimidine; M.P. of hydrochloride 157–158° C.; after recrystallisation from ether.

2 - pentyl - 4,5 - tetramethylene-6-(2-hydroxyethyl) amino-pyrimidine; M.P. 125–126° C., after recrystallisation from ethyl acetate-hexane.

2 - pentyl - 4,5 - tetramethylene - 6 - morpholino-pyrimidine; M.P. of hydrochloride 127–128° C., after recrystallisation from ether.

2 - propyl - 4,5-trimethylene-6-morpholino-pyrimidine; B.P. 152–153° C./0.001 mm. Hg; M.P. 53–54° C.

2 - propyl - 4,5-trimethylene-6-(2-hydroxyethyl)amino-pyrimidine; M.P. 126–127° C., after recrystallisation from ethyl acetate-hexane.

2 - propyl - 4,5 - trimethylene-6-[bis(2-hydroxyethyl) amino]-pyrimidine; M.P. 111–112° C., after recrystallisation from ethyl acetate-hexane.

2 - propyl - 4,5 - tetramethylene-6-(2-hydroxyethyl) amino-pyrimidine; M.P. 134° C. after recrystallisation from ethyl acetate-hexene.

2 - propyl - 4,5-pentamethylene-6-[bis(2-hydroxyethyl) amino]-pyrimidine; M.P. 67–68° C., after recrystallisation from hexane.

2 - propyl - 4,5 - pentamethylene-6-(2-hydroxyethyl) amino-pyrimidine; M.P. 142–143° C.

2 - propyl - 4,5 - hexemethylene-6-(2-hydroxyethyl) amino-pyrimidine; M.P. 153–154° C., after recrystallisation from ethyl acetate-hexane.

2 - propyl - 4,5 - hexamethylene - 6 - morpholino-pyrimidine; M.P. of hydrochloride 163–164° C., after recrystallisation from ether.

The following intermediates were prepared from the corresponding 2-carbethoxy-cyclanones:

2 - propyl - 4,5 - trimethylene-6-hydroxy-pyrimidine (M.P. 213–214° C.) which, by chlorination, gives 2-propyl-4,5-trimethylene-6-chloropyrimidine (B.P. 90–91° C./0.001 mm. Hg).

2 - propyl - 4,5 - tetramethylene-6-hydroxy-pyrimidine (M.P. 127° C.) which, by chlorination, gives 2-propyl-4,5-tetramethylene-6-chloropyrimidine (B.P. 92–93° C./ 0.001 mm. Hg; M.P. 39.5–40.5° C.).

2 - propyl - 4,5 - pentamethylene-6-chloro-pyrimidine. 16.2 g. (0.7 mol) sodium are dissolved in 400 ml. methanol to which is then added 39 g. (0.31 mol) butyramidine hydrochloride and 56.5 g. (0.31 mol) 2-carbethoxy-cycloheptanone, followed by boiling under reflux for 14 hours. The methanol is then removed in a vacuum and water is added to the residue. The solution obtained is neutralised with hydrochloric acid. The solid product obtained, 2 - propyl - 4,5 - pentamethylene-6-hydroxypyrimidine, is filtered off, washed with water and dried. The compound which melts at 170° C., is obtained in a yield of 59 g. (0.287 mol), which is 92% of theory.

A solution of 103 g. (0.5 mol) 2-propyl-4,5-pentamethylene-6-hydroxy-pyrimidine in 500 ml. phosphorus oxychloride is boiled under reflux for 5 hours. The reaction mixture is then cooled to 25° C. and excess phosphorus oxychloride removed in a vacuum. The residue is poured on to an ice-salt mixture and a 10% solution of sodium hydroxide is added thereto until the pH is 10. The mixture is extracted three times with ether, washed with water, dried over anhydrous sodium sulfate and evaporated to dryness. Distillation of the residue gives 103.5 g. (0.46 mol) 2-propyl-4,5-pentamethylene-6- chloro-pyrimidine which boils at 111–112° C./0.005 mm. Hg, the yield being 92% of theory.

EXAMPLE 3

2-chloro-4,5-tetramethylene-6-morpholino-pyrimidine

A solution of 20.3 g. (0.1 mol) 2,6-dichloro-4,5-tetramethylene-pyrimidine (obtained according to Z. Budesinsky and F. Roubinek, Coll. Czech. Commun., 29, (1964), 2341–2350) in 50 ml. anhydrous dioxan is mixed with a solution of 17.4 g. (0.2 mol) morpholine in 50 ml. anhydrous dioxan. The temperature slowly increases from 15° C. to 31° C. After stirring for 2 hours, the white solid formed is filtered off and washed with dioxan.

This solid is dissolved in chloroform and water, the organic phase is washed with water, dried and then evaporated to dryness. The residue is recrystallised from ethyl acetate and there are thus obtained 20 g. (0.079 mol) 2 - chloro - 4,5 - tetramethylene - 6 - morpholino-pyrimidine with a melting point of 180° C. (79% of theory).

In order to eliminate every ambiguity as to the position of the substitution the isomer 2-morpholino-4,5-tetramethylene-6-chloro-pyrimidine has been synthetized in an unaequivolcal manner.

Morpholino-formamidine and 2-carbethoxy-cyclohexanone are reacted in a methanolic solution in presence of sodium methylate. 2-morpholino-4,5-tetramethylene-6-hydroxy-pyrimidine (M.P. 214–215° C.) is obtained and submitted to the action of phosphorus oxychloride while boiling under reflux to give 2-morpholino-4,5-tetramethylene-6-chloro-pyridine; M.P. 113–114° C. (M.P. of the isomer 180° C.).

This 2 - morpholino - 4,5 - tetramethylene - 6 - chloro-pyrimidine has also been dehalogenated according to the method described in Example 7. The hydrochloride of 2-morpholino-4,5-tetramethylene-pyrimidine has a M.P. of 185–186° C., after recrystallisation from isopropanol-ether; (M.P. of the 6-morpholino isomer: 223–224° C.).

The following compounds are prepared in the same way as the compound of Example 3 (the 2-chloro isomer):

2 - chloro - 4,5 - tetramethylene-6-(2-hydroxyethyl) amino-pyrimidine; M.P. 138–139° C., after recrystallisation from ethyl acetate-hexane.

2 - chloro - 4,5-tetramethylene-6-[bis(2-hydroxyethyl) amino]-pyrimidine; M.P. 80° C., after recrystallisation from aqueous ethanol.

EXAMPLE 4

2,6-dimorpholino-4,5-tetramethylene-pyrimidine 12.4 g. (0.062 mol) 2,6-dichloro-4,5-tetramethylene-pyrimidine are mixed with 106 g. (1.22 mol) morpholine and the mixture heated for 14 hours to 130° C. The mixture is cooled and water and ether poured in. The ethereal phase is washed with water, dried and evaporated to dryness. The residue is recrystallised from a mixture of ethyl acetate and hexane. There are obtained 14.7 g. (0.048 mol) 2,6 - dimorpholino - 4,5-tetramethylene-pyrimidine with a melting point of 112–113° C., the yield being 77% of theory.

EXAMPLE 5

2-morpholino-4,5-tetramethylene-6-(2-hydroxyethyl) amino-pyrimidine 6.5 g. (0.0286 mol) 2-chloro-4,5-tetramethylene-6-(2-hydroxyethyl)amino-pyrimidine (prepared according to Example 3) and 25 g. (0.286 mol) morpholine are heated for 16 hours to 130° C. The reaction mixture is cooled, the solid obtained is filtered off, washed with water and dried. There are thus obtained 6.7 g. (0.0242 mol) 2-morpholino - 4,5 - tetramethylene-6-(2-hydroxyethyl)amino-pyrimidine with a melting point of 126–127° C., the yield being 85% of theory.

EXAMPLE 6

4,5-tetramethylene-6-(2-hydroxyethyl)amino-pyrimidine

A solution of 8 g. (0.0475 mol) 4,5-tetramethylene-6-chloro-pyrimidine and 5.8 g. (0.095 mol) ethanolamine in 100 ml. anhydrous dioxan is boiled under reflux for 30 hours. The reaction mixture is cooled, the supernatant dioxan layer is decanted off, this latter filtered through "Hyflocel" and the filtrate evaporated to dryness. The residue is recrystallised from ethyl acetate and there are obtained 6.7 g. (0.0348 mol) 4,5-tetramethylene-6-(2-hydroxyethyl)amino-pyrimidine with a melting point of 131–132° C., the yield being 73.5% of theory.

EXAMPLE 7

4,5-tetramethylene-6-morpholino-pyrimidine 7.6 g. (0.03 mol) 2-chloro-4,5-tetramethylene-6-morpholino-pyrimidine (prepared according to Example 3) are mixed with 3 g. of a catalyst (5% palladium charcoal) in 200 ml. ethanol. The mixture is hydrogenated at room temperature and atmospheric pressure. After 2 hours, the absorption of hydrogen is ended. The catalyst is filtered off and washed with a little hot ethanol. The filtrate is concentrated to a volume of about 100 ml. A cloudiness appears which is removed by filtration through animal charcoal and "Hyflocel."

The filtrate is acidified with gaseous hydrogen chloride. This is then again filtered through "Hyflocel" to remove the cloudiness which appears and ether is added to the filtrate, whereupon 6.3 g. (0.025 mol) of 4,5-tetramethylene-6-morpholino-pyrimidine hydrochloride separates out in the form of crystals melting at 215–217° C.

By recrystallisation of a sample of the product from a mixture of isopropanol-isopropyl ether (1:1), there is obtained a product melting at 223–224° C.

The same product can also be prepared, starting from 4,5-tetramethylene-6-chloro-pyrimidine, by the use of the method described in Example 6. The hydrochloride melts at 223–224° C.

EXAMPLE 8

2,6-bis-(2-hydroxyethyl)amino-4,5-tetramethylene-pyrimidine 20.3 g. (0.1 mol) 2,6-dichloro-4,5-tetramethylene-pyrimidine are mixed with 61 g. (1 mol) ethanolamine. The temperature increases to 80° C. The reaction mixture is then heated for 7 hours to 150–160° C.

The reaction mixture is cooled and water is added to dissolve excess ethanolamine and ethanolamine hydrochloride formed during the reaction. Upon cooling with ice, a crystalline product is obtained. The crystals are filtered off, washed with water and dried and thereafter recrystallised from a mixture of acetone and ether. The ether should be used in such an amount that a slight cloudiness appears at about 30° C.

After recrystallisation, thereare obtained 15.3 g. (0.06 mol) 2,6-bis-(2-hydroxyethyl)amino-4,5-tetramethylene-pyrimidine with a melting point of 133–134° C., the yield being 60% of theory.

I claim:
1. A compound selected from the group consisting of a 4,5'-polymethylene-pyrimidine base of the formula:

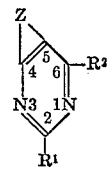

in which

Z is a polymethylene chain containing from 3 to 6 carbon atoms;

$R^1$ is a member selected from the group consisting of hydrogen, chlorine, alkyl containing from 1 to 5 carbon atoms and hydroxyethylamino when R² is morpholino; and R² is a member selected from the group consisting of hydrogen, hydroxyethylamino, bis-(hydroxyethyl)-amino and N-methyl-N-hydroxyethyl-amino when R¹ is morpholino;

and the pharmaceutically acceptable acid addition salts thereof.

2. 2 - propyl - 4,5 - tetramethylene-6-morpholino-pyrimidine.

3. 2 - propyl - 4,5 - pentamethylene-6-morpholino-pyrimidine.

4. 2 - isobutyl - 4,5 - tetramethylene - 6 - morpholino-pyrimidine.

5. 2 - propyl - 4,5 - trimethylene - 6 - morpholino-pyrimidine.

6. 2 - chloro - 4,5 - tetramethylene - 6-[bis(2-hydroxyethyl]-pyrimidine.

References Cited
UNITED STATES PATENTS
2,437,682   3/1948   Curd et al. _____ 260—256.4

ALEX MAZEL, Primary Examiner
A. M. TIGHE, Assistant Examiner

U.S. Cl. X.R.
260—246 B, 256.4 Q, 247.2 R; 424—248